US012147486B2

(12) United States Patent
Kawamoto et al.

(10) Patent No.: US 12,147,486 B2
(45) Date of Patent: Nov. 19, 2024

(54) SYSTEM AND METHOD FOR REPRESENTING BUSYNESS USING CONTENT SPECIFIC TO A PLACE

(71) Applicant: Google LLC, Mountain View, CA (US)

(72) Inventors: Ken Kawamoto, Tokyo (JP); Kevin Kwok, Tokyo (JP); Samuel G. Beckman, New York, NY (US); Winston Hsu, Sunnyvale, CA (US); Christopher Davie, New York, NY (US); Paul Henry Sullivan, New York, NY (US); Rita Chow, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/772,805

(22) PCT Filed: Dec. 30, 2021

(86) PCT No.: PCT/US2021/065654
§ 371 (c)(1),
(2) Date: Apr. 28, 2022

(87) PCT Pub. No.: WO2023/129160
PCT Pub. Date: Jul. 6, 2023

(65) Prior Publication Data
US 2023/0401269 A1    Dec. 14, 2023

(51) Int. Cl.
*G06F 16/00*     (2019.01)
*G06F 16/2457*   (2019.01)
*G06F 16/9537*   (2019.01)

(52) U.S. Cl.
CPC .... *G06F 16/9537* (2019.01); *G06F 16/24578* (2019.01)

(58) Field of Classification Search
CPC ................. G06F 16/9537; G06F 16/24578
See application file for complete search history.

(56) References Cited

U.S. PATENT DOCUMENTS

| 11,429,986 B2 * | 8/2022 | Russo | G06Q 10/04 |
| 11,727,419 B2 * | 8/2023 | Russo | G06Q 10/04 |
| | | | 705/7.29 |

(Continued)

FOREIGN PATENT DOCUMENTS

| JP | 5060047 B2 | 10/2012 |
| JP | 6572116 B2 | 9/2019 |
| WO | 2018084851 A1 | 5/2018 |

OTHER PUBLICATIONS

Katerina Ryabets, Visor Lets You See How Crowded Places Are in Real Time, Oct. 23, 2015, 5 pages. [Retrieved Nov. 15, 2021] Retrieved from the internet: <https://popupcity.net/observations/visor-lets-you-see-how-crowded-places-are-in-real-time/>.

(Continued)

*Primary Examiner* — Noosha Arjomandi
(74) *Attorney, Agent, or Firm* — Lerner David LLP (57) ABSTRACT

A level of busyness of a public place may be represented using content specific to the public place. Images, video, audio, or other content captured at the public place is correlated with busyness information for the public place at the time of capture. Representative content is selected and stored based on a number of factors such as to minimize resources in storing and transmitting the content. The selected representative content may be provided in response to a user request for information related to the public place, such that the user receives an accurate portrayal of how the public place would look, sound, and/or feel at a given time.

15 Claims, 5 Drawing Sheets

(56) References Cited

U.S. PATENT DOCUMENTS

| | | | | |
|---|---|---|---|---|
| 2003/0078055 A1* | 4/2003 | Smith | .................. | G08G 1/0104 |
| | | | | 340/988 |
| 2009/0228325 A1* | 9/2009 | Simmons | ........... | G06Q 30/0201 |
| | | | | 705/7.23 |
| 2011/0161119 A1* | 6/2011 | Collins | .................. | G06Q 40/08 |
| | | | | 705/4 |
| 2014/0180848 A1* | 6/2014 | Argue | ...................... | G07G 1/01 |
| | | | | 705/16 |
| 2015/0081348 A1* | 3/2015 | Avera | .................... | G06Q 10/02 |
| | | | | 705/14.66 |
| 2017/0039661 A1* | 2/2017 | Vanslette | ............... | G06Q 10/20 |
| 2018/0069817 A1* | 3/2018 | Constantinides | ..... | H04L 67/306 |
| 2019/0130322 A1* | 5/2019 | Chen | .................. | G06Q 30/0202 |
| 2019/0208365 A1* | 7/2019 | Benrachi | ................ | G06Q 50/26 |
| 2021/0123744 A1* | 4/2021 | DeLuca | .................. | G06F 16/29 |
| 2023/0244301 A1* | 8/2023 | Lee | ........................ | G06F 1/163 |
| | | | | 345/156 |

OTHER PUBLICATIONS

International Search Report and Written Opinion for International Application No. PCT/US2021/065654 dated Jul. 25, 2022. 13 pages.

* cited by examiner

SYSTEM AND METHOD FOR REPRESENTING BUSYNESS USING CONTENT SPECIFIC TO A PLACE

CROSS-REFERENCE TO RELATED APPLICATIONS

This application is a national phase entry under 35 U.S.C. § 371 of International Application No. PCT/US2021/065654 filed on Dec. 30, 2021, the entire disclosure of which is incorporated herein by reference.

BACKGROUND

Some map information may provide an indication of how busy a particular geographic location has historically been. This information is typically averaged over months of visit data. Aggregating over a long period of time enables generation of occupancy distribution histograms for smaller places where non-aggregated data may be too noisy and sparse to be displayed. However, aggregating over such long period of time may also require significant resources, such as memory and bandwidth.

BRIEF SUMMARY

The present disclosure provides a method for providing content specific to a particular public place, the method comprising receiving, by one or more processors, a request for busyness level information regarding the particular public place, accessing a database storing content specific to the particular public place, the content capturing one or more busyness levels, evaluating, with one or more processors, features of the content, selecting, with the one or more processors based on the evaluating, content representing a busyness level that is responsive to the request, and providing for output, in response to the request, the selected content.

Evaluating content may include comparing features of first candidate content with features of second candidate content. Comparing features of the first candidate content with the features of the second candidate content may include scoring each of the first candidate content and the second candidate content based on the features in each. Selecting the content may include ranking the content based on the scores.

According to some examples, the content comprises visual content. In such examples, the features may comprise at least one of an area of the particular place captured by the visual content, objects depicted in the visual content, an angle of image capture for the visual content, a time of day the visual content was captured, a time of year the visual content was captured, or image quality of the visual content. According to some examples, the content comprises audio content.

Evaluating the content may include comparing features of the content with features that would be present at the particular public place when the particular public place has the busyness level that is responsive to the request.

According to some examples, the request may explicitly or implicitly specify a timeframe for which the busyness level information is sought. Such specified timeframe may be at a future time in relation to a time when the request was received, at a current time, or at a past time.

Another aspect of the disclosure provides a system for providing content specific to a particular public place, comprising a memory and one or more processors in communication with the memory. The one or more processors may be configured to receive a request for busyness level information regarding the particular public place, access a database storing content specific to the particular public place, evaluate features of the content, select, based on the evaluating, content representing a busyness level that is responsive to the request, and provide for output, in response to the request, the selected content.

In evaluating content, the one or more processors may be configured to compare features of first candidate content with features of second candidate content. In comparing features of the first candidate content with the features of the second candidate content, the one or more processors may be configured to score each of the first candidate content and the second candidate content based on the features in each. In selecting the content, the one or more processors may be configured to rank the content based on the scores.

In some examples, the content comprises visual content. The features may include at least one of an area of the particular place captured by the visual content, objects depicted in the visual content, an angle of image capture for the visual content, a time of day the visual content was captured, a time of year the visual content was captured, or image quality of the visual content. According to some examples, the content comprises audio content.

Evaluating the content may include comparing features of the content with features that would be present at the particular public place.

In some examples, the request may specify a timeframe for which the busyness level information is sought. The specified timeframe may be at a future time in relation to a time when the request was received, a present time, or a past time.

Yet another aspect of the disclosure provides a non-transitory computer-readable medium storing instructions executable by one or more processors for performing a method of providing content specific to a particular public place, the method comprising receiving a request for information regarding the particular public place, accessing a database storing content specific to the particular public place, the content capturing one or more busyness levels, evaluating features of the content, selecting, based on the evaluating, content representing a busyness level that is responsive to the request, and providing for output, in response to the request, the selected content. Evaluating the content may include comparing features of first candidate content with features of second candidate content and scoring each of the first candidate content and the second candidate content based on the features in each; and wherein selecting the content comprises ranking the content based on the scores.

Another aspect of the disclosure provides a method for providing content specific to a particular public place, the method comprising receiving, by one or more processors, first candidate content for the particular public place, the first candidate content captured at the particular public place at a given time, determining, by the one or more processors, a busyness level for the particular public place at the given time, identifying, by the one or more processors, second candidate content for the particular public place, the second candidate content having an associated busyness level corresponding to the determined busyness level, selecting, by the one or more processors, content from the first or second candidate content to serve as a representation of the determined busyness for the particular place, and storing the selected content in association with the determined busyness level and the particular place. According to some examples, the method may further include deleting non-selected content from the first and second content from memory.

The method may further include identifying, with the one or more processors, features in the first and second candidate content.

The method may further include ranking, with the one or more processors, the first and second candidate content based on the identified features, wherein selecting the content from the first or second candidate content comprises selecting the content based on the ranking. The first and second candidate content may include images and the features may include at least one of objects recognized in the images, an angle of image capture, or an area captured in the images. Identifying the features may include applying an image recognition tool.

The features may include at least one of a time of day or time of year the content was captured.

The first and second candidate content may include audio files.

The method may further include receiving a request for information regarding the particular place and outputting the selected content in response to the request.

In some examples, the given time is a time of capture of the first candidate content and determining the busyness level includes determining real-time busyness. Determining the real-time busyness may include determining whether the public place meets a privacy qualification by determining whether aggregate location information fills a predetermined portion of a data structure for the public place within a predetermined amount of time.

Another aspect of the disclosure provides a system for providing content specific to a particular public place, comprising a memory storing first and second candidate content, and one or more processors in communication with the memory. The one or more processors may be configured to access the first candidate content for the particular public place, the first candidate content captured at the particular public place at a given time, determine a busyness level for the particular public place at the given time, identify second candidate content for the particular public place, the second candidate content having an associated busyness level corresponding to the determined busyness level, select content from the first or second candidate content to serve as a representation of the determined busyness for the particular place, and store the selected content in association with the determined busyness level and the particular place.

The one or more processors may be further configured to delete non-selected content from the first and second content from memory.

The one or more processors may be further configured to include identify features in the first and second candidate content. The one or more processors may be further configured to rank the first and second candidate content based on the identified features, wherein selecting the content from the first or second candidate content comprises selecting the content based on the ranking. The first and second candidate content may include images and the features include at least one of objects recognized in the images, an angle of image capture, or an area captured in the images.st and second candidate. Identifying the features may include applying an image recognition tool.

The features may include at least one of a time of day or time of year the content was captured.

The first and second candidate content may include audio files.

The one or more processors may be further configured to receive a request for information regarding the particular place, and output the selected content in response to the request.

Another aspect of the disclosure provides a non-transitory computer-readable medium storing instructions executable by one or more processors for performing a method of providing content specific to a particular public place, the method comprising receiving first candidate content for the particular public place, the first candidate content captured at the particular public place at a given time, determining a busyness level for the particular public place at the given time, identifying second candidate content for the particular public place, the second candidate content having an associated busyness level corresponding to the determined busyness level, selecting content from the first or second candidate content to serve as a representation of the determined busyness for the particular place, and storing the selected content in association with the determined busyness level and the particular place.

DETAILED DESCRIPTION

Overview

The technology relates generally to measuring a level of busyness of a public place, and providing content for the public place representing the level of busyness. For example, the content may be images, videos, or other indicia for the place showing a number of people, level of activity, etc. at the place. In some examples, the place may be a business, an open public place such as a park, an online event, etc. The content may be processed for privacy, such as by blurring faces and other sensitive information. Content representing a given level of busyness or other state of the public place may be selected based on one or more criteria, such as by prioritizing or ranking the content captured during a particular time of day, season, etc., from a particular perspective, etc. Moreover, the content may be stored in a data structure in association with one or more tags or other identifiers to conserve storage resources, such that a given image may be produced as output for representing the level of busyness or other state regardless of when that level of busyness or other state occurs. For example, an image captured of Business A on a first day may be stored in association with one or more identifiers. If a search for the Business A is performed on a second day, which may be days, weeks, months, etc. after the first day, the stored image may be used as a representation of busyness for the Business A whether the search requests to see the busyness level at a time before or during the second day, or a predicted busyness level at a time after the second day. By storing the image for identification and access in representing the state of Business A at various time in past, present, and future, storage resources are reduced.

According to some examples, real-time busyness levels at a time a request is received by a user may be determined, and the visual representation may be provided in connection with the real-time busyness levels. For example, in determining the real-time busyness levels, it may be determined whether the given public place meets a first qualification with respect to privacy. The first qualification may be based on a variety of conditions, such as types of establishments intended for public visitation, non-sensitive and non-prohibited places, historical visitation rates, historical visit data quality, etc. For example, an available amount of aggregated location information corresponding to a given public place at a given time is measured. If an insufficient amount of data is available, the given public place is disqualified and ignored. Ignoring such public places that do not qualify provides increased privacy protection, as well as better quality results. Continuing this example, if sufficient data is available, the given public place meets the first qualification, and busyness information is computed for the given public place based on the aggregated location information.

The busyness information may be provided for display. For example, map information related to the public place ("Business A") is provided, along with other information corresponding to the public place. Examples of such other information include a phone number, directions, website, operating hours, etc. For each of the operating hours, a typical busyness level is shown based on historical data. In addition, the current busyness level may be overlaid on top of the typical levels, thereby giving users a frame of reference.

Content representing the busyness information may be selected and provided for display along with the map information or other information related to the public place. One or more contents may be selected and stored for each potential level of busyness for the Business A. For example, content captured for the Business A may be received from any of a variety of sources, such as from owners of the Business A, visitors of the Business A, etc. The captured content may be reviewed, such as by using one or more machine learning techniques, to identify characteristics of the content and index the content based on the identified characteristics. Examples of such techniques include image processing identifying objects or other features of an image, such as objects in an image indicating whether the image captured an inside of the Business A, an amount of light captured in the image indicating a time of day, etc. The content for Business A may be ranked based on such identified objects or features. For example, images of an interior of Business A may be weighted higher than images of exterior, higher quality images may be ranked higher than lower quality, images providing a comprehensive view may be ranked higher than images with a more limited view, etc. One or more highest ranked contents may be tagged and indexed for access at corresponding busyness levels. For example, the highest ranked images for each possible level of busyness may be selected for representation of the Business A and tagged based on the corresponding busyness level. According to some examples, the one or more selected images may be tagged for additional information, such as time of day, time of year, etc. By ranking and indexing the contents, the contents may be accessed quickly while minimizing consumption of resources. The contents that are not selected for representation of a business at a given state, such as a given level of busyness, may be discarded, thereby further conserving storage resources.

Example systems used to qualify, compute, and display the busyness levels may include, for example, one or more processors in communication with one or more databases and mobile devices. For example, raw location information may be provided by mobile devices that have authorized the sending of such information. The location information may include GPS coordinates, signal strength from a particular access point, semantic information such as images of landmarks, or the like. The raw location information may be correlated with a point of interest. For example, GPS coordinates may be correlated with known coordinates of a business. The correlated location information is then used to determine whether a sufficient amount of location information is available for a given location. If so, the quality of such data is verified, and only qualifying information is provided for output.

In an example method for aggregating data and determining if the first qualification is met for the public place, the location information report from a device carries an identifier that distinguishes the reports from different users' devices. A hash function is applied to the report's identifier and the raw identifier is then discarded for the purposes of aggregation. The number of unique hashes are counted, for example, by storing each unique hash in a data structure, such as a vector. Due to collisions in the hash function, the number of unique hashes recorded may be a noisy underestimate of the true number of identifiers observed. Moreover, this data structure retains none of the original location data report identifiers. When a threshold number of unique hashes are stored in the data structure within a predetermined amount of time, the location is qualified as a privacy-qualified place. For example, if 50 unique hashes are stored in the vector within 1.5 days, the location may be marked as a privacy-qualified place. If the location does not qualify, it is regarded as privacy-disqualified and ignored. When the threshold is reached, the data structure is cleared, resetting the count of unique hashes to zero, thus restarting the count. If the threshold is not reached within some maximum period of time, the data structure may be cleared as well, also resetting the count. Each such clearing of the data structure removes all the hashes and thus the only remaining trace of the location data report identifiers that may have contributed to them.

The hash function may be such that it has a high collision rate. For example, a Bloom filter may be used to hash a large set of identifiers down to a small set of discrete values. The cost of observing a location data identifier is therefore low as calculating a hash value and setting a bit is a computationally efficient process. Moreover, by setting the threshold number of hash values to be stored in the predetermined portion of the data structure before meeting the first qualification, the amount of data to be stored at any instant in time is minimized.

Once the public place is qualified from a privacy perspective, real-time busyness may be determined with a finer granularity. In this regard, a second data structure may be used. The second data structure may be a bit vector, similar to the first data structure, with a lesser number of bits. For example, the second data structure may be 10 bits. This second data structure may be used to aggregate the unique hashes. Each time the second data structure is filled, it may be emptied and refilled. An occupancy event may be recorded once the predetermined portion of the data structure is filled, provided all additional privacy and quality requirements have been met. Each such occupancy event represents a noisy underestimate of the true number of identifiers observed.

A period of time corresponding to the filling of the second data structure is measured. For example, it may be determined that the second data structure was filled in 5 minutes, or that the second data structure was filled 8 times in one hour.

Hashed information is thus retained in the second data structure for a short amount of time, namely the time until the predetermined portion is full. As described above, resetting the data structure destroys the list of hashes and, with it, any of the short-lived information associated with the location data report identifiers that might have contributed to it. Network traffic is also reduced, since only occurrence of aggregate occupancy events need be communicated to the system components responsible for determining busyness, and not individual location data reports. Reducing the amount of data to be stored in this manner enables the concept to be applied to a wide range of locations.

According to some examples, before providing the computed real-time busyness information for display, a quality of the computed real-time busyness information may be verified. Historical busyness information for a particular location is relatively reliable. The computed real-time busyness information may be compared to the historical busyness information, or historical and real-time busyness plus other signals may be combined in a statistical model to produce a better estimate. Qualified real-time data may be provided for display. However, data that is not qualified may be ignored. For example, data that does not meet the quality threshold is discarded, thereby conserving network and database resources for only locations with quality data. Additionally, a user experience is improved by only receiving reliable information.

The determination of content representing the busyness information is controlled in a manner which preserves privacy of individual location data reports contributing to the aggregate. The determination of content representing the occupancy information is also controlled in a manner which requires low data storage requirements, processing requirements and network traffic. Furthermore, the determination of content representing the occupancy information is controlled in a manner which avoids unnecessary network traffic and minimizes network disruption. This means that the content representing occupancy information is determined and delivered to user devices in a manner which is efficient in terms of its use of network resources.

Example Systems

Figure 1A:
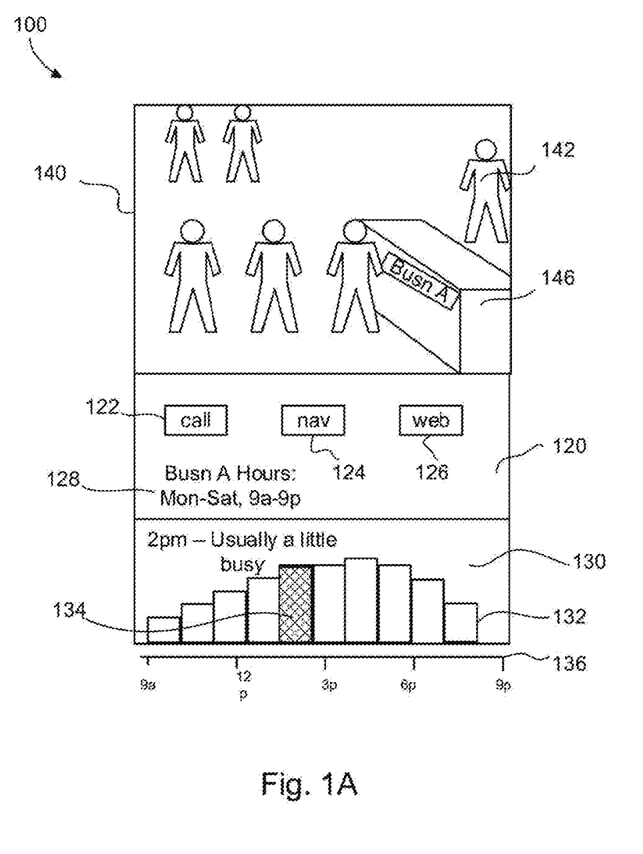
FIGS. 1A-1B illustrate example displays including visual representations of busyness according to aspects of the disclosure.
Figure 1B:
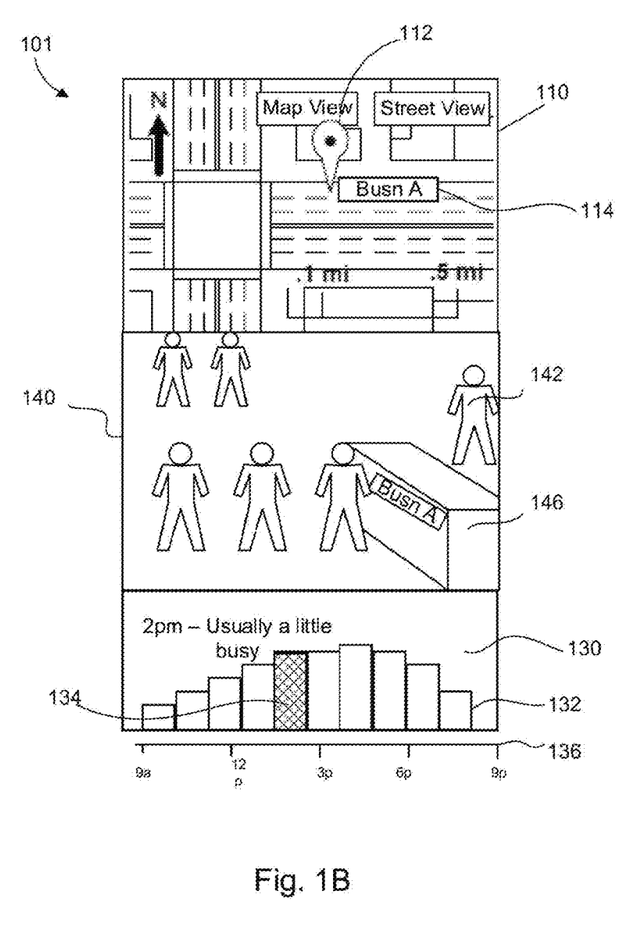

FIGS. 1A-1B illustrate examples of how the current busyness information may be displayed. In the example of FIG. 1A, graphic 100 includes a visual representation section 140, an informational section 120, and a graphical business section 130. In the example of FIG. 1B, graphic 101 includes a map section 110, informational section 120, and graphical busyness section 130. The graphics 100, 101 may be displayed, for example on a client device, in response to a request for information related to Business A. The request for information may include, for example, an address, business name, general geographical area, type of business, or any of a variety of other information related to the Business A. The request may also include a particular time for the Business A, such as a time a user is interested in visiting the Business A. While two examples are provided illustrating how the visual representation section 140 may be displayed for the requested time, it should be understood that these are merely examples and that many different graphics, layouts, or the like are possible that include a visual representation of how crowded the Business A is at a particular time.

The visual representation section 140 may include one or more images captured of the Business A during a level of busyness that corresponds to the level of busyness associated with the requested time. The images may include, for example, still images, video, panoramic images, or any other type of image.

Depending on the level of busyness, the images may capture one or more people 142. For example, during a time when the Business A is very busy, the image may capture a large number of people 142 at the Busyness A and space between people 142 may be limited. In contrast, during a time when the Business A is not very busy, the image may capture only a few or one or no people 142. Such images may provide a clear indication to a user of how crowded the user could expect Business A to be at the requested time. In this regard, the user can gauge a comfort level of visiting the Business A at the requested time. The user may further prepare for the visit, such as by preparing a plan for what they will do at the Business A, how long they will spend, what they will bring, etc. By way of example only, if the Business A is a grocery store and the visual representation section 140 indicates many people 140 at the Business A, the user may decide to limit a time spent at the Business A, limit a number of items purchased from the Busyness A, to bring a face covering or other personal protective equipment, etc.

The image selected for display in the visual representation section 140 may be selected based on one or more factors. Examples of such factors include objects in the image, a perspective or capture angle and position of the image, a time the image was captured relative to a current time, a quality of image, etc. According to some examples, the image may be selected from a number of candidate images based on such factors. For example, the image may be automatically selected as a result of a machine learning process. According to some examples, each candidate image may be weighted based on the one or more factors and ranked. For example, object recognition techniques may be applied to determine that a first image is taken of an inside of the Business A. By way of example only, the object recognition may recognize a counter 144 or bar or other furnishings that would typically be found inside an establishment. Images determined to be taken inside may be ranked higher than images taken outside.

One or more images may be preselected for each potential level of busyness for the Business A and stored. The preselected images may be selected based on, for example, the one or more factors and rankings. The preselected one or more images may be tagged within information identifying the corresponding level of busyness represented. Such corresponding level of busyness may be determined, for example, based on data from devices at the location at a time the image was captured. By way of example, a real-time busyness may be determined, as described further below, while the image is captured and such busyness may be associated with the image as metadata, a tag, or the like. The preselected images may be stored in association with the metadata, tags, or other information. Images for a given location that are not selected for representing any level of busyness for the given location may be deleted from memory.

In addition or the alternative to a visual representation of the level of busyness, the information for the Business A may include other types of representations of the level of busyness. For example, the information may include a short audio clip providing an indication of a noise level that would be experienced at the Business A at a given level of busyness.

The busyness section 130 includes an indication of how busy the requested location is at a current time. In this example, typical levels of busyness are indicated by unshaded bars 132, while the current level of busyness is indicated by shaded bar 134. In this regard, the current busyness is shown in relation to the typical busyness, thereby providing a frame of reference. The current busyness level may be highlighted in any of a number of ways, such as by a graphic effect, such as a blinking light, colors, shapes, etc. A timeline 136 may also be provided for reference, indicating a time corresponding to each bar in the chart. Each bar may correspond to a one-hour interval, or to any other interval of time. Moreover, the timeline 136 may correspond to a range of hours that the Business A is in operation.

Referring to FIG. 1B, the map section 110 may include a depiction of geographical objects at a particular geographic location. For example, the geographic objects may include roads, buildings, landmarks, statues, street signs, etc. The objects may be depicted in, for example, a roadgraph, aerial imagery, street level imagery, or the like. The map section 110 may also depict a marker 112 corresponding to a requested location, such as Business A. The marker identifies where the requested location is located with respect to other objects depicted in the map section. The marker may be depicted in any of a variety of shapes and forms. Further, a label 114 may identify that the marker 112 corresponds to Business A. Though not shown, in some examples the marker or map near the marker may be depicted so as to indicate real-time busyness of the geographical location. For example, a size, shape, shading, or other aspect of the marker or map may change as the busyness level rises or falls. As another example, additional icons may be positioned on the map near the marker to indicate busyness. It should be understood that these are merely examples, and any of a number of indicators may be used.

Referring back to FIG. 1A, informational section 120 provides further information related to the Business A. Such information may include user input controls 122, 124, 126, enabling the user to take a predetermined action. The predetermined action may be, for example, calling a phone number for the Business A, requesting navigational information to the Business A, or visiting another website such as a site for the Business A. The informational section 120 may also include text 128, such as a listing of the operating hours of the Business A.

While a number of example sections are described above in connection with FIGS. 1A-B, and the real-time busyness information is shown as being displayed in a bar graph, it should be understood that these are merely examples. The real-time busyness information may be provided for display in any of a number of ways, such as text, pictorial diagrams, charts, graphs, etc. In other examples, the real-time busyness information may be provided to other applications, such as scheduling applications, ride-service applications, games, or any of a variety of other applications. Moreover, according to some examples, only predicted busyness levels based on historical data may be provided without indications of real-time busyness.

Figure 2:
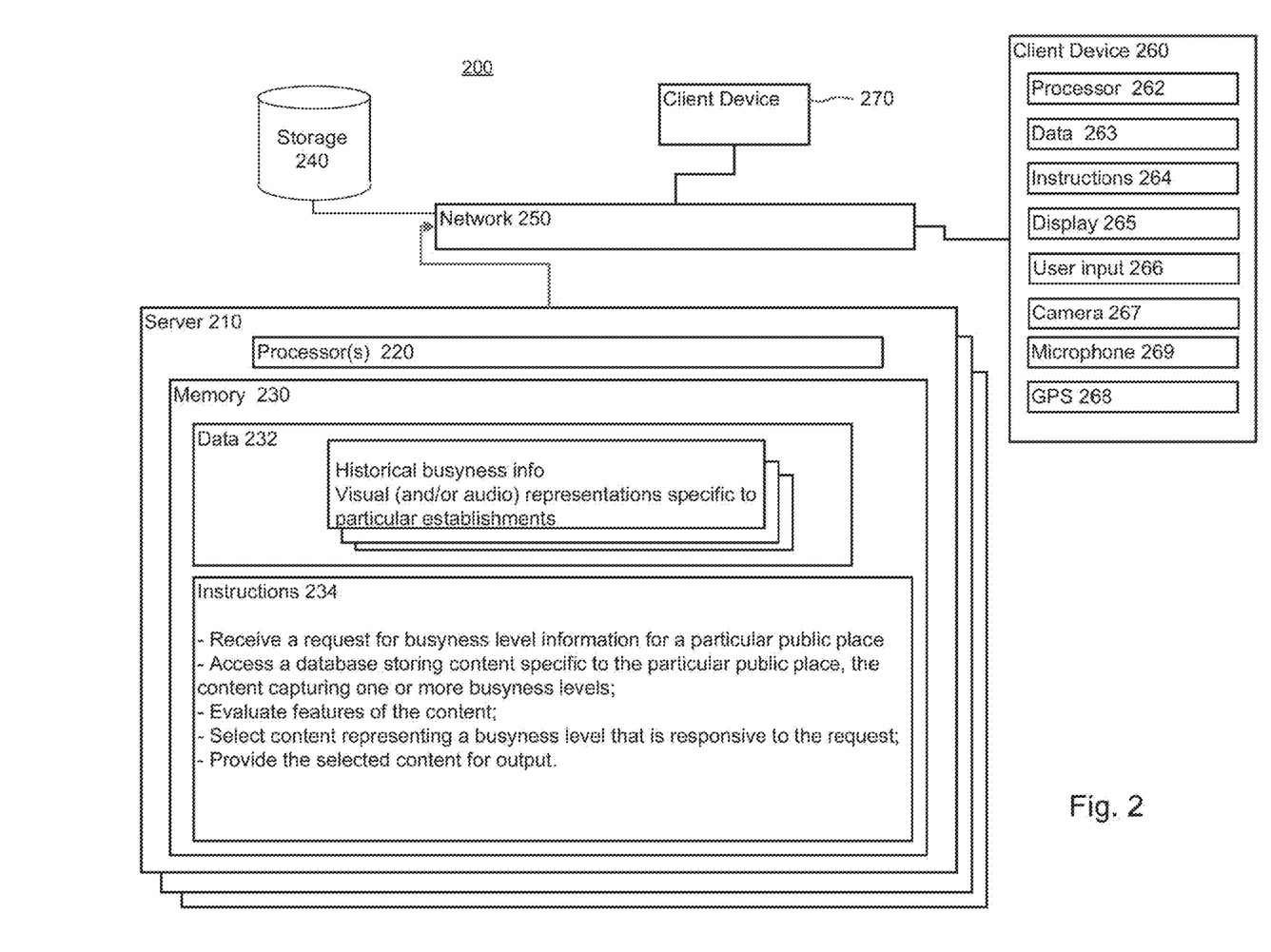
FIG. 2 is an example block diagram illustrating an example system according to aspects of the disclosure.

FIG. 2 illustrates an example system used to identify and output visual or audio representations of busyness levels specific to particular establishments. It should not be considered as limiting the scope of the disclosure or usefulness of the features described herein. In this example, system 200 can include computing devices 210 in communication with one or more client devices 260, 270, as well as storage system 240, through network 250. Each computing device 210 can contain one or more processors 220, memory 230 and other components typically present in general purpose computing devices. Memory 230 of each of computing device 210 can store information accessible by the one or more processors 220, including instructions 234 that can be executed by the one or more processors 220.

Memory 230 can also include data 232 that can be retrieved, manipulated or stored by the processor. The memory can be of any non-transitory type capable of storing information accessible by the processor, such as a harddrive, memory card, ROM, RAM, DVD, CD-ROM, write-capable, and read-only memories.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 232 may be retrieved, stored or modified by the one or more processors 220 in accordance with the instructions 234. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 220 can be any conventional processors, such as a commercially available CPU. Alternatively, the processors can be dedicated components such as an application specific integrated circuit ("ASIC") or other hardware-based processor. Although not necessary, one or more of computing devices 210 may include specialized hardware components to perform specific computing processes, such as decoding video, matching video frames with images, distorting videos, encoding distorted videos, etc. faster or more efficiently.

Although FIG. 2 functionally illustrates the processor, memory, and other elements of computing device 210 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 210. Accordingly, references to a processor, computer, computing device, or memory will be understood to include references to a collection of processors, computers, computing devices, or memories that may or may not operate in parallel. For example, the computing devices 210 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 260.

Each of the computing devices 210, 260, 270 can be at different nodes of a network 250 and capable of directly and indirectly communicating with other nodes of network 250. Although only a few computing devices are depicted in FIG. 2, it should be appreciated that a typical system can include a large number of connected computing devices, with each different computing device being at a different node of the network 250. The network 250 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 210 may include web servers capable of communicating with storage system 240 as well as computing devices 260, 270 via the network 250. For example, one or more of server computing devices 210 may use network 250 to transmit and present information to a user on a display, such as display 265 of computing device 260. In this regard, computing devices 260, 270 may be considered client computing devices and may perform all or some of the features described herein.

Each of the client computing devices 260, 270 may be configured similarly to the server computing devices 210, with one or more processors, memory and instructions as described above. Each client computing device 260, 270 may be a personal computing device intended for use by a user, and have all of the components normally used in connection with a personal computing device such as a central processing unit (CPU), memory (e.g., RAM and internal hard drives) storing data and instructions, a display such as display 265 (e.g., a monitor having a screen, a touch-screen, a projector, a television, or other device that is operable to display information), and user input device 266 (e.g., a mouse, keyboard, touch-screen, or microphone). The client computing device may also include a camera 267 for recording video streams and/or capturing images, speakers, a network interface device, and all of the components used for connecting these elements to one another. In some examples, the client device 260 may include a microphone for capturing audio, such as sounds or noise levels at a particular establishment at a given time. The client computing device 260 may also include a location determination system, such as a GPS 268. Other examples of location determination systems may determine location based on wireless access signal strength, images of geographic objects such as landmarks, semantic indicators such as light or noise level, etc.

Although the client computing devices 260, 270 may each comprise a full-sized personal computing device, they may alternatively comprise mobile computing devices capable of wirelessly exchanging data with a server over a network such as the Internet. By way of example only, client computing device 260 may be a mobile phone or a device such as a wireless-enabled PDA, a tablet PC, a netbook, a smart watch, a head-mounted computing system, or any other device that is capable of obtaining information via the Internet. As an example, the user may input information using a small keyboard, a keypad, microphone, using visual signals with a camera, or a touch screen.

As with memory 230, storage system 240 can be of any type of computerized storage capable of storing information accessible by the server computing devices 210, such as a hard-drive, memory card, ROM, RAM, DVD, CD-ROM, write-capable, and read-only memories. In addition, storage system 240 may include a distributed storage system where data is stored on a plurality of different storage devices which may be physically located at the same or different geographic locations. Storage system 240 may be connected to the computing devices via the network 250 as shown in FIG. 1 and/or may be directly connected to any of the computing devices 210.

Storage system 240 may store data, such as historical busyness information for particular locations, visual and/or audio representations of busyness specific to particular establishments, etc. For example, the busyness information for a popular business for a past number of months or years may be stored. Only geographic locations that have passed a privacy qualification may be stored, such that increased privacy protection is afforded. For example, the geographic locations must have a number of logged visits above a predetermined threshold.

In some examples, using the stored data, the computing devices 110 may qualify a public place for computation of real-time busyness information. The qualification for the real-time busyness information may take place in multiple parts, such as a first qualification based on privacy and a second qualification based on accuracy.

Figure 3:
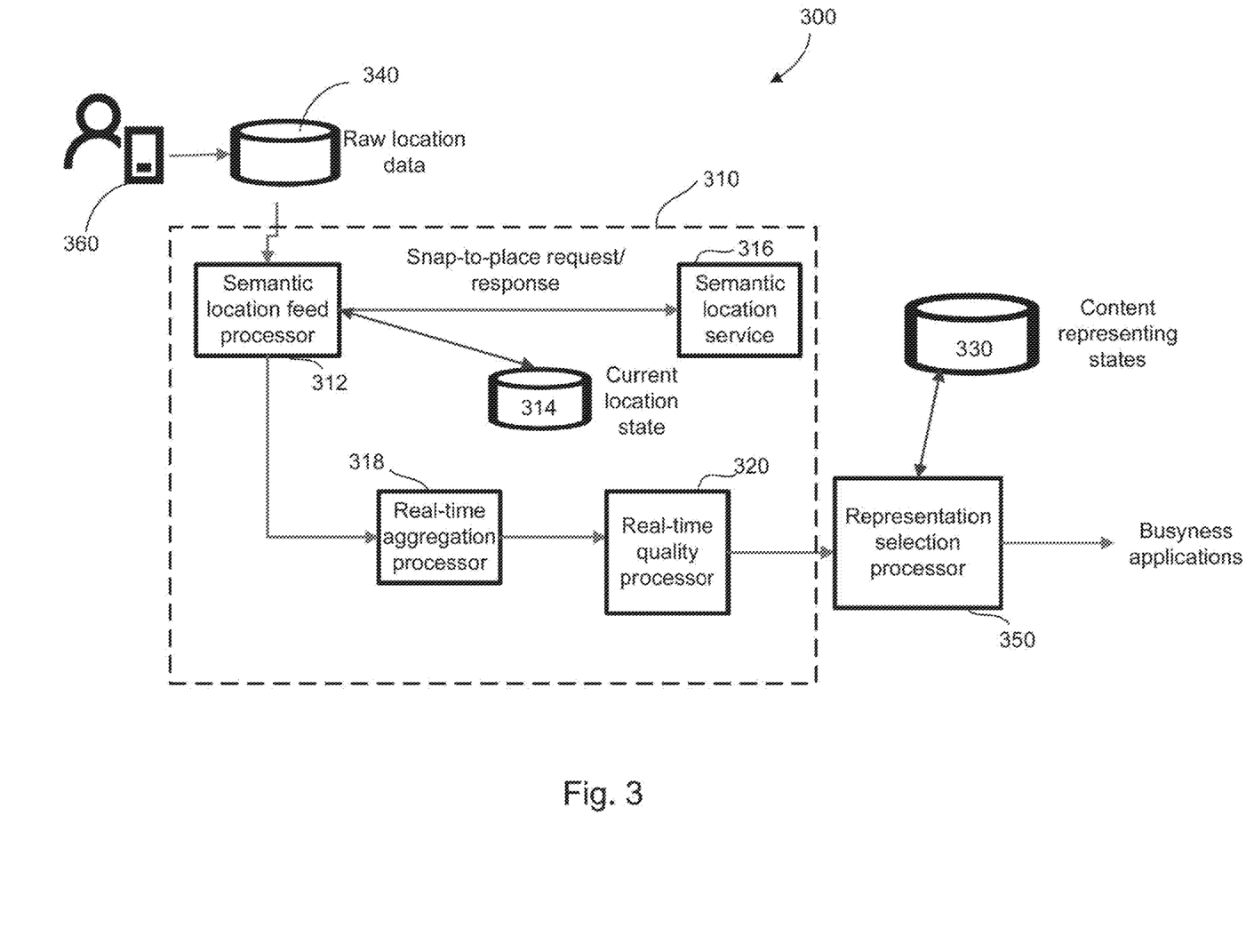
FIG. 3 is an example block diagram illustrating another example system according to aspects of the disclosure.

FIG. 3 illustrates another example system 300 that may be used to qualify, compute, and display real-time busyness levels along with representations of the busyness levels that are specific to the particular place. The representations specific to the particular place may include, for example, images, video, audio, or other content that was captured at the particular place.

As shown in this example, mobile device 360 provides information to a raw location database 340, which further provides information to computing system 310. Computing system 310 includes one or more components, such as processors and memory. For example, as shown in FIG. 3, the computing system 310 includes a semantic location feed processor 312, a semantic location service 316, a current location state database 314, a real-time aggregation processor 318, and a real-time quality processor 320. The computing system 310 provides busyness information to representation selection processor 350, which identifies contents from representative content storage 330 that indicates a level of busyness using features specific to the particular place. The identified contents may be output to a busyness application.

The raw location data received at the database 340 from the mobile device 360 includes only information authorized by a user of the mobile device. For example, the user may adjust settings on the mobile device to allow or disallow providing information such as geographic coordinates or other location-based information. Moreover, privacy protections are provided for any user data transmitted by the mobile device, including, for example, anonymization of personally identifiable information, aggregation of data, filtering of sensitive information, encryption, hashing or filtering of sensitive information to remove personal attributes, time limitations on storage of information, or limitations on data use or sharing. For example, detailed location information may only be stored for a relatively short-lived period of time in the database 340. Moreover, data may be anonymized and aggregated such that individual user data is not revealed. Rather than using any personal information to uniquely identify a mobile device, a hash of a unique identifier may be used. For example, the hash may be a cryptographic hash. The hash may have a high collision rate. The hash may be applied to a unique number or text string associated with mobile device. In this regard, no personal information is stored.

The semantic location feed processor 312 may be a streaming processor that consumes the raw location feed from the raw location database 340 and determines a current semantic location for each mobile device on each update. For example, each time the semantic location feed processor 312 receives location information for a mobile device, it may correlate the location information with an establishment. For example, if the received location information indicates that the mobile device is at coordinates (x, y), the semantic location feed processor 312 may determine that Business A is located at the coordinates (x, y) and therefore the mobile device is at Business A. In addition or alternative to using geographic coordinates, other location information may be used to determine the current semantic location, such as images of landmarks, wireless access received signal strength indicators, barometric pressure, noise level, light level, etc.

In determining the current semantic location, the semantic location feed processor 312 communicates with semantic location service 316 and current location state database 314. The semantic location service 316 may be a remote procedure call (RPC) service that supports multiple semantic location-related calls. For example, the semantic location feed processor 312 issues a "snap-to-place" request to the semantic location service 316. The semantic location feed processor 312 uses a response to the request to determine semantic location from raw latitude/longitude data. The current location state database 314 may store only locations that meet a privacy qualification. For example, the locations offered as a possible match to the raw location data may only include public places, such as businesses, parks, etc.

The semantic location feed processor 312 publishes the current semantic location for each mobile device to the real-time aggregation processor 318. The real-time aggregation processor 318 consumes the current semantic location feed published by the semantic location feed processor 312, aggregating visits by place, over time. For example, the real-time aggregation processor 318 may aggregate visits within a predetermined period of time, such as hours, days, weeks, months. In aggregating the visits, the processor 318 may use a data structure, such as a bit vector. By way of example only, a 128 bit vector may be populated with a new bit for each time a unique hash appears for Business A. A separate bit vector may be used for each different establishment. If a particular hash value appears more than once in a given time period, such as several minutes or an hour, it may be assumed that the hash represents the same device, and no additional bits are added to the vector for the additional appearance. For example, if the same device goes in and out of the Business A, it will only be counted once. The real-time aggregation processor 318 may be used to determine if a given location meets a privacy qualification. For example, if a predetermined portion of the bit vector for the Business A is filled within the predetermined time period, the Business A may meet a privacy threshold. By way of example only, if 65 bits of the 128 bit vector are filled within one day, the Business A may meet the privacy threshold. However, if an insufficient number of bits are filled, the Business A may be privacy disqualified and removed from the database 314. The real-time aggregation processor may produce a trace of real-time busyness that can be used to detect places that are unusually busy, or unexpectedly quiet. A density of reporting users can be used to infer real-time busyness of places, unexpected closures, unusual crowds, and other events.

According to one example, after a place is privacy qualified, the real-time busyness may be computed with a finer granularity. For example, an input may be a stream of {timestamp, hashed identifier, place-identifier} tuples, and an output may be a stream of {timestamp, place-identifier, delta} trigger events. The delta is how long it took to reach a threshold for the number of unique hashes seen. The shorter the trigger interval, the higher the number of people present. According to one example, a second bit vector is used per place being aggregated, wherein the second bit vector may be smaller than the first. For each hash identifier on the input, a single bit is set. When the configured threshold number of bits is set, a trigger event is generated for that place, and the bit vector is reset. Multiple appearances of the same identifier set the same bit, so that device will not be counted multiple times during one trigger interval. Different identifiers may set the same bit. The threshold then represents the minimum number of unique devices seen at that location. The expected number can be determined by simulation using random identifiers. For instance, for a threshold of 40 bits out of 64, there is a 99.3% chance that at least 50 unique identifiers were seen, and the expected number is 63.6. Using the above approach, identifiers are not retained and cannot be reconstructed, the same identifier will not be counted twice in the same interval, and the data structure is very compact.

The trigger interval for a place at a given time reflects the number of people who are there. More precisely, it measures the reporting rate of devices present who have location history reporting enabled. This may be proportional to an actual number of people present. Thus, for example, if the second bit vector is filled every 5 minutes before it needs to be reset, the place corresponding to the second bit vector may be assumed to be much busier than if the second bit vector was filled every 30 minutes.

Real-time quality processor 320 may be used to determine if the real-time data is quality/accuracy qualified. For example, the real-time data for a given place from the real-time aggregation processor 318 may be compared to historical data for the given place. Based on the comparison, a live occupancy percentage for places above some quality threshold is provided. According to one example of this second qualification, for each hour that the place (e.g., Business A) is open, a difference between the computed real-time busyness level and historical business levels is determined. For each hour where the difference is relatively low, such as below a predetermined threshold, the hour may be marked as "good." The predetermined threshold may be, for example, less than 20%-35% difference, or more or less. Likewise, for each hour where the difference is relatively high, such as above a predetermined threshold, the hour may be marked as "bad." The threshold difference for bad hours may be, by way of example only, above 60%, above 70%, above 80%, or the like. As a result, for a total number of hours in an evaluation period, some may be marked "good," some may be marked "bad," and some may be unmarked. An evaluation period may be, for example, a number of days, weeks, months, etc. According to one example, an evaluation period of approximately 2 weeks is used. If the number of "good" hours is above a predetermined percentage (e.g., 80% or 90%) of the total number of hours, and the number of "bad" hours is below a predetermined percentage (e.g., 2%, 5%, 15%, etc.) of the total number of hours, the real-time data may meet the second qualification and be considered accuracy qualified.

Although real-time busyness may be computed at a finer granularity, in some examples the data provided for output to a display is level across a longer span of time. For example, while real-time busyness may be computed every 5, 10, 15 minutes, etc., the output may be combined across a half-hour, hour, or some other longer time period. In this regard, some predictions may be used to supplement data from the very recent past. For example, for a real-time busyness query at 9:05 am, real-time data from 8:05-9:04 am is available, but an output includes predictions about occupancy of the place from 9-10 am. The need for prediction may depend on a structure of the output. For example, for a histogram depicting busyness levels for each hour, more prediction may be necessary than for a histogram or another display structure depicting busyness levels for shorter time periods.

The representation selection processor 350 may select, from database 330, a representation for the particular place corresponding to the level of busyness determined for the particular place by the computing device 310. For example, the representation selection processor 350 may identify one or more candidate images associated with the measured or predicted level of busyness for the particular public place. According to some examples, this may include correlating a timestamp and/or location data in metadata for the images with the location of the particular public place and the busyness level at the particular public place at the timestamp. According to other examples, the images may be tagged with busyness information, and identifying the candidate images may include identifying images for the particular public place that are tagged with levels of busyness corresponding to a request.

If more than one candidate images are identified, the representation selection processor 350 may select which image to use for the visual representation of busyness. For example, the representation selection processor 350 may rank the images based on features thereof. By way of example, the processor 350 may perform image processing, such as object recognition, to determine what is captured in the image. Objects such as tables, stools, bars, counters, trays, etc. may indicate that the image is taken of an operating space for the public place, such as an indoor or outdoor dining room for a restaurant, etc. Other features, such as lighting, area captured, persons detected, image resolution, camera focus, camera angle, etc. may also be identified. Rankings may be assigned based on such detected objects, features, persons, etc. By way of example only, images determined to capture a wide area with persons inside the place during operating hours may be ranked higher than images capturing a narrower area, without people, outside of normal operating hours, etc. An image may be selected based on the assigned rank, such as by selecting the highest-ranking image or selecting the highest ranking image that also meets one or more predetermined criteria.

Example Methods

Further to the example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 4:
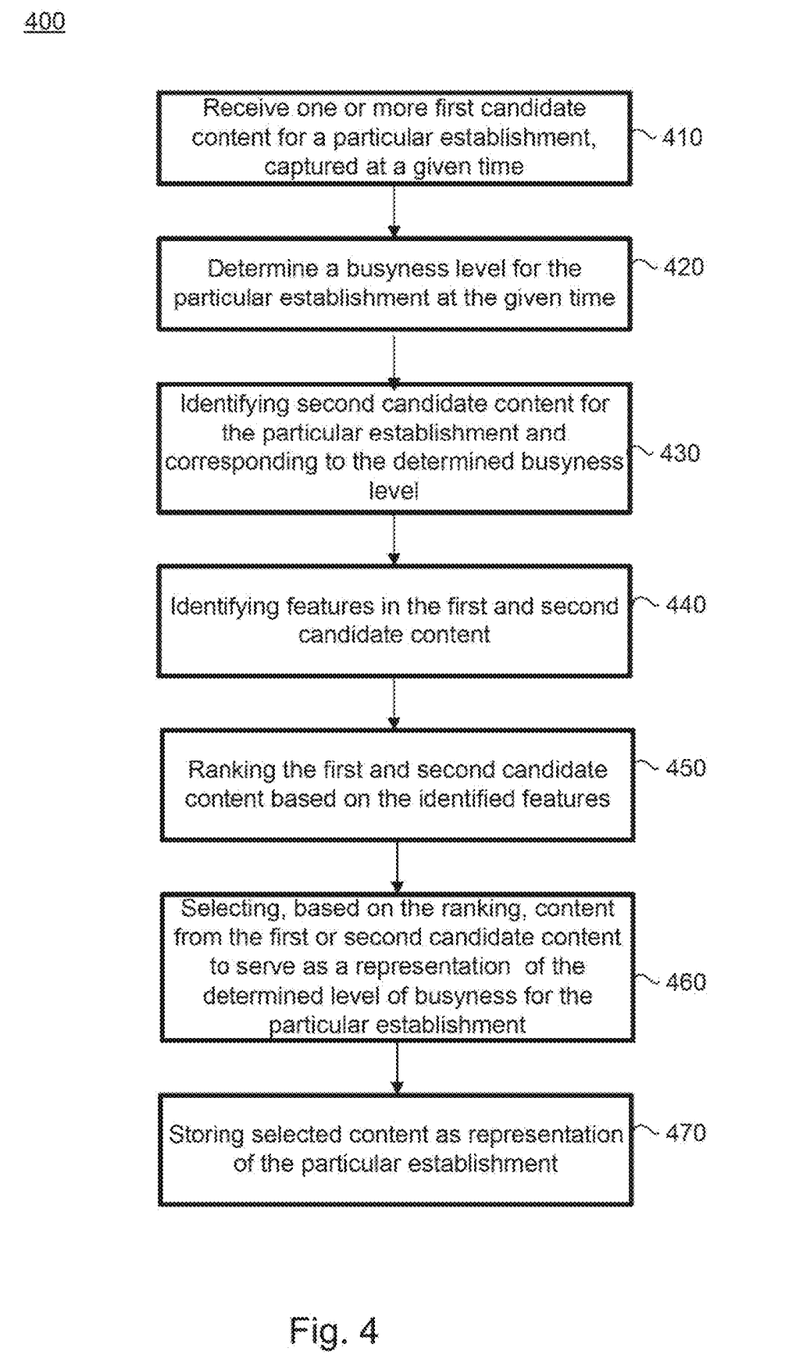
FIG. 4 is a flow diagram illustrating an example method of selecting and storing representative content for a particular establishment according to aspects of the disclosure.

FIG. 4 illustrates an example method 400 of selecting and storing representative content for a particular establishment according to aspects of the disclosure.

In block 410, first candidate content is received for a particular establishment. The content may be, for example, visual content such as images, video, or the like. According to other examples, the content may be audio content, such as sound recordings. In further examples, other types of content may be used, such as screenshots for online events or games, etc. The first candidate content is captured at a given time. For example, where the content is an image taken of the particular establishment, a timestamp corresponding to the time of image capture may be the given time. The particular establishment may be, for example, a business with a physical presence, such as brick-and-mortar, at a location. Such businesses may include stores, restaurants, theaters, museums, etc. According to some examples, the particular establishment may be any other type of public place, such as a park. According to further examples, the particular establishment may be a virtual establishment, such as an online event, multiplayer game, etc.

In block 420, a busyness level is determined for the particular establishment at the given time. For example, historical location data from an aggregation of user devices may be used to determine how many people were at the particular establishment at the given time. According to some examples, the location data may be verified using other data, such as transaction receipts from a business for the given time, reports from an owner, etc. According to some examples, the first content may be captured and received by the processors in real-time or near-real-time, and the busyness level for the particular establishment may be determined in real-time and matched with the first content.

In block 430, second candidate content is identified for the particular establishment, the second candidate content corresponding to the determined busyness level. For example, the second candidate content may have been captured at a same time or a different time than the given time, but matched with a same busyness level based on historical location data or other data. The second candidate content may include one or more images, audio, or other types of content, similar to the first content. According to some examples, the second candidate content may include numerous files.

In block 440, features may be identified in the first content and second content. For example, where the content includes images, image processing techniques may be applied to detect objects, people, features, etc. Where the content includes audio, for example, audio processing may be performed to ascertain noise level, identify a source of particular sounds such as silverware clanking, music, voices, etc.

In block 450, the first and second candidate content may be ranked based on the identified features. For example, one or more of the identified features may be used to assign a score to the first and second content, where such scores are used to rank the content. For example, images including features that indicate the image was captured inside during operating hours when people are present may be scored and ranked higher than images of a parking lot or an exterior of a building.

In block 460, content from the first or second candidate content may be selected based on the ranking. The selected content may serve as a representation of the determined busyness level for the particular establishment.

In block 470, the selected content may be stored in association with the determined busyness level for the particular establishment. The first and second content that was not selected may be deleted. By removing unselected content from a database, resources are conserved. Moreover, limiting the end results to selected content provides for an efficient use of network resources, such as bandwidth, as well as an improved end-user experience.

Figure 5:
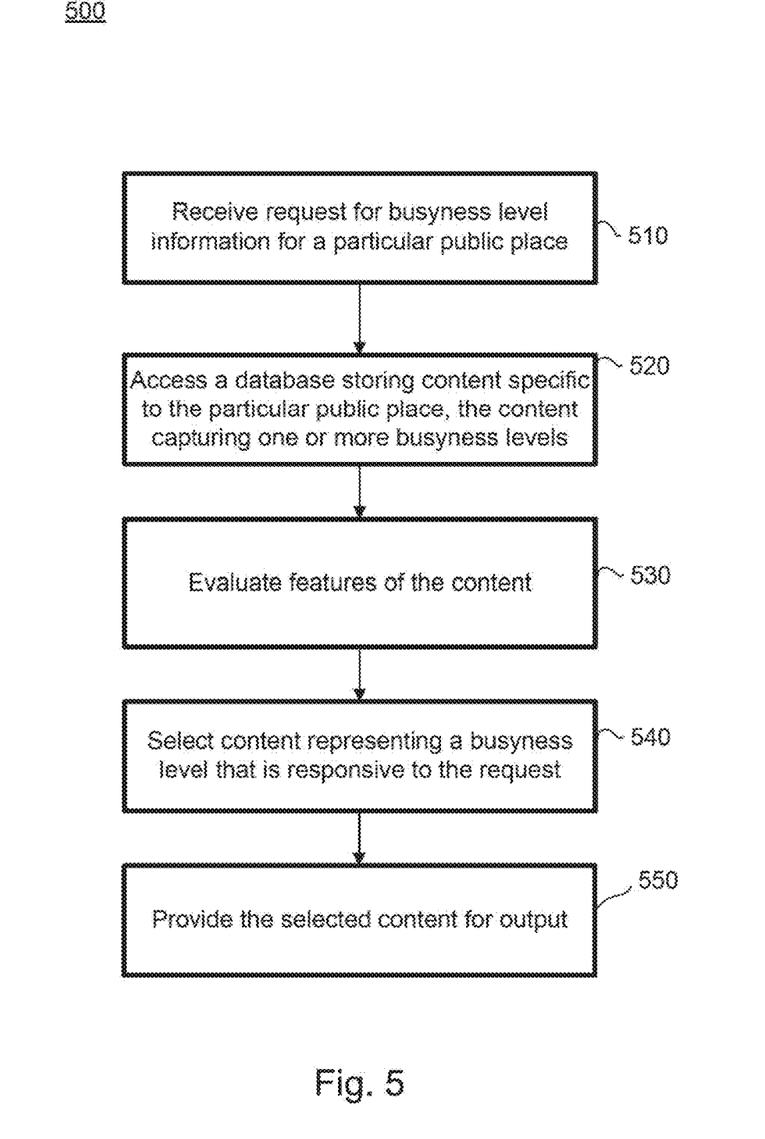
FIG. 5 is another flow diagram illustrating providing representative content in response to a request according to aspects of the disclosure.

FIG. 5 illustrates a method 500 for providing representative content in response to a request. For example, the method 500 may be performed by one or more processors in connection with a busyness application, such as a maps application, business directory, information resource, etc.

In block 510, a request for busyness level information regarding a particular public place is received. The particular public place may be, for example, a store, restaurant, business, mall, entertainment or amusement complex, museum, park, beach, pop-up shop, or any other indoor or outdoor place that people in the general public can visit.

The request may be received from a client device. The busyness level information requested may be any information indicating how busy the particular public place is at a given time. For example, the busyness level information may include information indicating how many people are at the particular public place, how crowded the place is, how quickly customers are being serviced, etc. According to some examples, the request may specify a timeframe. For example, the request may seek the busyness level information for a time in the past, for a current time when the request is received, and/or for a future time. By way of example only, the request may seek information regarding a state of Business A at lunchtime on a weekday. The timeframe may be explicitly or implicitly included in the request. For example, an explicit request may enter search text such as "Business A at 6 pm today" or may select a timeframe from a timeline or other graphic of a graphical user interface. An implicit request may be inferred based on information in the search or other information. For example, a request for "breakfast place" may infer that restaurants are sought during a timeframe in which breakfast is served. As another example, a timeframe may be inferred based on prior search history, calendar entries relevant to the place, or any other data for which the user has authorized access. The request can be received during or outside of normal operating hours for the particular public place. According to other examples, the request does not include a specified timeframe.

According to some examples, a busyness level for the particular public place may be identified. The identified busyness level may be a real-time busyness level, a historical busyness level corresponding to a time in the past, or a predicted busyness level for a time in the future. Such predictions may include projections based on historical and/or current information. For example, if the particular establishment is determined to have a high level of busyness every Thursday afternoon for a past few weeks, it may be predicted that the particular establishment will have a similarly high level of busyness on a next Thursday afternoon. The busyness level may be identified by, for example, computations performed by the one or more processors. According to other examples, the busyness level may be identified by accessing information from another device or database. For example, historical busyness levels may be identified by accessing logged data. According to some examples, other factors may impact determinations of busyness levels, such as seasons, holidays, nearby events, sales, etc. According to further examples, a busyness level sought may be specified in the request. For example, a user may specify that the request seeks information for the public place at a "high" level of busyness, "low" level of busyness, or any other level.

In block 520, the one or more processors access a database storing content specific to the particular public place. The content captures one or more busyness levels. For example, the database may store a plurality of images, audio clips, or other content. Each of the content may have been captured at the particular public place. For example, various content in the database may have been captured at different times in the past, such that different content corresponds to different levels of busyness. By way of example, some content may have been captured when the particular public place is at a high level of busyness, such as when a business is serving a high volume of customers that are present at the public place within the same time-frame. Other content may have been captured when the place is less busy, such as moderately busy, not busy, etc.

According to some examples, the content may be stored in the database in association with an indication of busyness level. For example, images, audio files, or the like may be tagged with metadata indicating a busyness level of the place at a time the content was captured. Such corresponding busyness information may be determined based on historical data, observations during capture, observations of features in the content, etc. According to other examples, the content may be stored in a table or other data structure that identifies the busyness level as being associated with the content.

In block 530, the one or more processors evaluate features of the content within the database. In some examples, evaluation of features may vary depending on a type of content. For example, where the content is visually-based, such as still images, videos, panoramas, etc., the features may include visual features. Examples of such visual features may include an area of the particular place captured by the visual content, objects depicted in the visual content, an angle of image capture for the visual content, a time of day the visual content was captured, a time of year the visual content was captured, or image quality of the visual content. The evaluation may include image recognition and/or object recognition. By way of example only, object recognition techniques may be used to identify a service counter in content and people on both sides of the service counter. In some examples, content including particular objects may be ranked higher than other images. Where content is audio based, such as audio files, the features may include audio features, such as noise levels, sound quality, length of audio clip, etc.

According to some examples, evaluating the content may include filtering the content. For example, the content may be filtered such that only content meeting a predetermined filter criteria is considered as a candidate for representing the busyness level for the public place. Such filtering may be based on, for example, timestamps, objects shown within images, quality thresholds, or any other feature. According to some examples, the filtering may exclude content associated with busyness levels that are not responsive to the request. For example, if a busyness level responsive to the request is a "high" level of busyness, then content associated with busyness levels of moderate, low, extremely high, or any level other than "high" may be excluded from further evaluation.

According to some examples, the evaluating may include comparing two or more content items within the database. For example, the comparison may be performed in determination of which content items is a better representation of the busyness level for the public place. In some examples, the determination may be based on a predetermined feature list, wherein features on the predetermined list may be set by the application provider, the owner of the public place, or another entity. By way of example only, images captured during operating hours may be a feature that would be more favorable than images captured outside of normal operating hours. According to other examples, the determination may be based on features relevant to the request. For example, if it is inferred that the request seeks busyness levels for a future time when a particular event is occurring at the public place, the evaluating may favor images that depict the place during previous events.

According to some examples, evaluating the content may include scoring the content based on the features. For example, if the request explicitly or implicitly specifies particular features, content including those features may be scored higher than content that does not include such features. By way of example, if the request seeks busyness level information for a business during a holiday, content captured during the holiday or visual content depicting decorations for the holiday may be scored higher than other content. The content may be ranked based on the scores.

According to some examples, the comparing, scoring, and/or other evaluation is performed after filtering, such that only content meeting the predetermined filter criteria is further evaluated. In this regard, computing resources are conserved, as a limited subset of content is evaluated and therefore scoring computations are performed over less data than an entire database.

In block 540, selected content may be identified and retrieved from memory, the selected content representing a busyness level for the public place that is responsive to the request. The selected content may be selected based on, for example, the evaluating of block 530. By selecting only a limited subset of content representing the busyness level responsive to the request for retrieval from the database, network communication resources such as bandwidth are conserved.

In block 550, the selected content may be provided for output in connection with information requested for the particular establishment in response to the request. For example, images may be provided for display in connection with other information, such as illustrated in the examples of FIGS. 1A-B. In other examples, audio data may be provided for output through a speaker. The audio data may be output in addition or alternative to visual representations.

Upon receipt of the output, a user that submitted the request, seeking to gauge how crowded a place is likely to be at a certain time, may accurately understand the busyness level through the visual or audio data. For example, the user may see images of the specific establishment they are looking to visit and see approximately how many people are likely to be there, how close together the people are likely to be, how much open space is likely available, etc. As another example, the user may hear how loud and noisy the place is likely to be. As such, the user can get an accurate feel for what they would likely experience in person if visiting the place during the requested timeframe.

The determination and output of occupancy information is controlled in a manner which avoids unnecessary network traffic and minimizes resources such as storage space. For example, a data structure may comprise a plurality of memory locations, each memory location arranged to accommodate an indicator, wherein on recording an indicator in the data structure, the memory location in which an indicator is to be recorded is determined in accordance with the identity of the corresponding device identified at the location of interest. Each memory location is associated with a set of devices, and on identifying the presence of a device in a set at the location of interest, an indicator is recorded at the corresponding memory location, such that no further indicator can be recorded at the same memory location if the presence of a device in the set is subsequently identified at the location of interest until the data structure is reset. The data structure may be a bit vector, wherein the size of the bit vector represents the number of the plurality of memory locations, and each memory location is configured to accommodate a bit, wherein an indicator corresponds to a bit having a predetermined one of two states. The method may further comprise applying a predetermined hash function to the unique identifier of a device on determining the presence of the device at the location of interest, wherein the size of the bit vector represents the range of values that can be generated by the predetermined hash function. The predetermined hash function may be cryptographic. The predetermined hash function may have a collision rate sufficiently high to represent the unique user identifiers in 128 hash values, the bit vector has a length of 128 bits, and the threshold number of indicators corresponds to ten bits. Further to any of the above examples, the method may further comprise recording the one or more indicators in a further bit vector, and resetting the content of the further bit vector on recording a further threshold number of indicators in the further bit vector, and qualifying the location of interest as a public location of interest on recording the further threshold number of indicators in the further bit vector, wherein the further threshold number of indicators is larger than the threshold number of indicators of the data structure. The further bit vector may be reset after a predetermined time period elapses.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for providing content specific to a particular public place, the method comprising:
   receiving, by one or more processors, a request for busyness level information regarding the particular public place at a given time;
   determining, by the one or more processors, an expected busyness level for the particular public place at the given time;
   accessing a database storing content specific to the particular public place, the content including images received from various sources and depicting various busyness levels captured at the particular public place at times different than the given time;
   evaluating, with one or more processors executing a machine learning model, features of the content, the evaluating comprising comparing the busyness levels depicted in the images with the expected busyness level at the particular public place at the given time, wherein the evaluating comprises comparing features of first candidate content and features of second candidate content, and scoring each of the first candidate content and the second candidate content based on the features in each;

selecting, with the one or more processors based on the evaluating, one or more images from the content, the selected one or more images representing the busyness level that is responsive to the request; and providing for output, in response to the request, the selected one or more images.

2. The method of claim 1, wherein selecting the content comprises ranking the content based on the scores.

3. The method of claim 1, wherein the content comprises visual content.

4. The method of claim 3, wherein the features comprise at least one of an area of the particular place captured by the visual content, objects depicted in the visual content, an angle of image capture for the visual content, a time of day the visual content was captured, a time of year the visual content was captured, or image quality of the visual content.

5. The method of claim 1, wherein the content comprises audio content.

6. The method of claim 1, wherein evaluating the content comprises comparing features of the content with features that would be present at the particular public place when the particular public place has the busyness level that is responsive to the request.

7. The method of claim 1, wherein the request specifies a timeframe for which the busyness level information is sought, and the specified timeframe is at a future time in relation to a time when the request was received.

8. A system for providing content specific to a particular public place, comprising:

a memory;

one or more processors in communication with the memory, the one or more processors configured to:
  receive a request for busyness level information regarding the particular public place at a given time;
  determine an expected busyness level for the particular public place at the given time;
  access a database storing content specific to the particular public place, the content including images received from various sources and depicting various busyness levels captured at the particular public place at time different than the given time;
  evaluate features of the content, the evaluating comprising comparing the busyness level depicted in the images with the expected busyness level at the particular public place at the given time, wherein the evaluating comprises comparing features of first candidate content and features of second candidate content, and scoring each of the first candidate content and the second candidate content based on the features in each;
  select, based on the evaluating, one or more images from the content, the selected one or more images representing the busyness level that is responsive to the request; and
  provide for output, in response to the request, the selected one or more images.

9. The system of claim 8, wherein in selecting the content the one or more processors are configured to rank the content based on the scores.

10. The system of claim 8, wherein the content comprises visual content.

11. The system of claim 10, wherein the features comprise at least one of an area of the particular place captured by the visual content, objects depicted in the visual content, an angle of image capture for the visual content, a time of day the visual content was captured, a time of year the visual content was captured, or image quality of the visual content.

12. The system of claim 8, wherein the content comprises audio content.

13. The system of claim 8, wherein evaluating the content comprises comparing features of the content with features that would be present at the particular public place.

14. The system of claim 8, wherein the request specifies a timeframe for which the busyness level information is sought, and the specified timeframe is at a future time in relation to a time when the request was received.

15. A non-transitory computer-readable medium storing instructions executable by one or more processors for performing a method of providing content specific to a particular public place, the method comprising:

receiving a request for busyness level information regarding the particular public place at a given time;

accessing a database storing content specific to the particular public place, the content including images received from various sources and depicting various busyness levels captured at the particular public place at times different than the given time;

evaluating features of the content, the evaluating comprising comparing the busyness levels depicted in the images with the expected busyness level at the particular public place at the given time, wherein the evaluating comprises comparing features of first candidate content and features of second candidate content, and scoring each of the first candidate content and the second candidate content based on the features in each;

selecting, based on the evaluating, one or more images from the content, the selected one or more images representing a busyness level that is responsive to the request; and providing for output, in response to the request, the selected one or more images.

* * * * *